United States Patent
Uchiyama et al.

[15] 3,675,547
[45] July 11, 1972

[54] PHOTOGRAPHING SYSTEM FOR USE WITH A FLASH DEVICE

[72] Inventors: Takashi Uchiyama; Tadashi Ito, both of Kanagawa-ken; Mutsuhide Matsuda, Tokyo, all of Japan

[73] Assignee: Canon Kabushiki Kaisha, Tokyo, Japan

[22] Filed: June 16, 1970

[21] Appl. No.: 46,732

[30] Foreign Application Priority Data

June 23, 1969 Japan.................................44/49790
Nov. 20, 1969 Japan.................................44/93176

[52] U.S. Cl...........................................................95/10 CT
[51] Int. Cl..................................................................G01j 1/46
[58] Field of Search.................................95/10 C, 10 CT

[56] References Cited
UNITED STATES PATENTS 3,465,656  9/1969  Wick...................................95/11.5 X
3,326,103  6/1967  Topaz....................................95/10 C Primary Examiner—Samuel S. Matthews
Assistant Examiner—Monroe H. Hayes
Attorney—McGlew and Toren

[57] ABSTRACT

A photographing system for use with a flash device comprising a flash-auto mechanism (FA mechanism) including an electronic timer circuit for exposure control a power capacitor for storing charges, a power supply circuit for charging said power capacitor, a control circuit for detecting said charges stored in said power capacitor and for adjusting said flash-auto mechanism in accordance with said charge across said power capacitor, and a discharge circuit connected across said capacitor and including a discharge lamp for triggering said discharge lamp to operate said system.

21 Claims, 8 Drawing Figures

INVENTOR.
TAKASHI UCHIYAMA
TADASHI ITO
MUTSUHIDE MATSUDA
By: McGlew & Toren
ATTORNEYS

▽ INDICATES AN IGNITION POINT

PHOTOGRAPHING SYSTEM FOR USE WITH A FLASH DEVICE

The present invention relates to a photographing system for use with a flash device, and more particularly a camera system having a flash-auto mechanism including an electronic timer circuit for exposure control.

For exposure with the use of a flash device, a value obtained by dividing a guide number by a distance between an object and the flash device is set as a stop value, and a mechanism for automatically setting a stop value for flash exposure is known as disclosed in U.S. Pat. No. 3,344,724. In one flash-auto mechanism as disclosed in U.S. Pat. Application Ser. Nos. 820,988 and 820,901 now U.S. Pat. No. 3,613,534, the focusing ring of a camera is cooperatived with an aperture setting ring; a guide number of a flash device is by an auto-flash switching ring on the side of the camera for setting the guide number, and a variable or adjustable resistor cooperative with the focussing ring is connected to the EE circuit in the camera having a flash-auto mechanism, thereby determining a stop value by an angle of diflection of a pointer of a meter. For flash exposure, the guide number of the flash device is generally considered constant when a suitable stop value or exposure factor is determined. When a flash device has no circuit for automatically maintaining constant a voltage charged across a main capacitor of the flash device, under-exposure tends to occur because of insufficient charging of the main capacitor, for example due to insufficient charging time or deterioration of a battery.

The present invention has been made for eliminating the above defects, and particularly for providing a camera system in which an optimum exposure is expected with aid of an electronic timer circuit.

An object of the present invention is to provide a photographing system having a flash device in which a voltage charged across a main capacitor of the flash device is detected by use of a flash-auto mechanism including an electronic timer circuit for exposure control combined with the flash-auto mechanism and the electronic timer circuit is so controlled as to automatically obtain an optimum exposure.

According to one aspect of the present invention, the flash-auto mechanism is automatically controlled depending upon the power source voltage or a luminescence of the flash device, so that even when the power voltage is varied, it can be suitablly compensated, thereby obtaining the optimum exposure all the time.

According to another aspect of the present invention, the variation in voltage charged across the main capacitor of the flash device is indicated by an indicator, whereby flash exposure can be accomplished at a desired stop value or aperture.

According to another aspect of the present invention, an operator can view through a view finder a signal representative of a condition of the system.

According to another aspect of the present invention, a control unit or circuit is interposed between the flash device and the flash-auto mechanism in such a manner that a low voltage output is in proportion to a high power source voltage of the flash device, thereby matching one to the other in the best manner.

According to another aspect of the present invention, a flash device having a control unit or circuit and a camera having a flash-auto mechanism are constructed as separate, independent unit in such a manner that when the flash device is attached to the camera, flash exposure becomes possible by an extremely simple operation. Furthermore, it is very simple to switch between the flash exposure and an exposure without use of a flash lamp.

When the flash device is detached from the camera, exposure without use of the flash lamp may be set without any additional operation. Thus it is seen that the camera of a simple construction is provided.

According to still another aspect of the present invention, a flash peak may be easily synchronized with an aperture value determined through the flash-auto mechanism.

Another object of the present invention is to provide a photographing system for use with a flash device in which the point in time at which a synchro-contact is closed during operation of a diaphragm blade or a shutter blade serving also as a diaphragm blade is controlled by supplied voltage for the flash device, said voltage being used as a signal to a flash-auto mechanism which is adjusted in accordance with a distance to an object being photographed, film sensitivity and guide number, in a manner such that as the voltage increases, the shutter is closed earlier.

One main feature of the present invention lies in that a compensating power source is connected to at least one element of a time constant circuit in parallel or in series or in such a manner that a Wheatstone bridge is formed, and the compensating power source is of same or opposite polarity to a main power source.

Still another object of the present invention is to provide a photographing system characterized in that a shutter speed and an aperture are controlled to assure an optimum exposure by charging a voltage corresponding to a photographing information, said voltage being supplied from a compensating power source which is connected to a time constant circuit both ends of which are connected to a main power source, said time constant circuit effecting electronic exposure control to afford a shutter operation, said compensating power source being of same or opposite polarity to said main power source.

The present invention will be understood from the following description of preferred embodiments thereof in reference to the attached drawings in which:

FIG. 8 – 1 is a schematic block diagram in which a compensating power source is connected in series with a time constant circuit, and FIG. 8 – 2 is a schematic block diagram in which a compensating power source is connected in parallel with a time constant circuit.

It should be noted that throughout the drawings the same components will be shown with the same reference characters or numerals.

Figure 1:
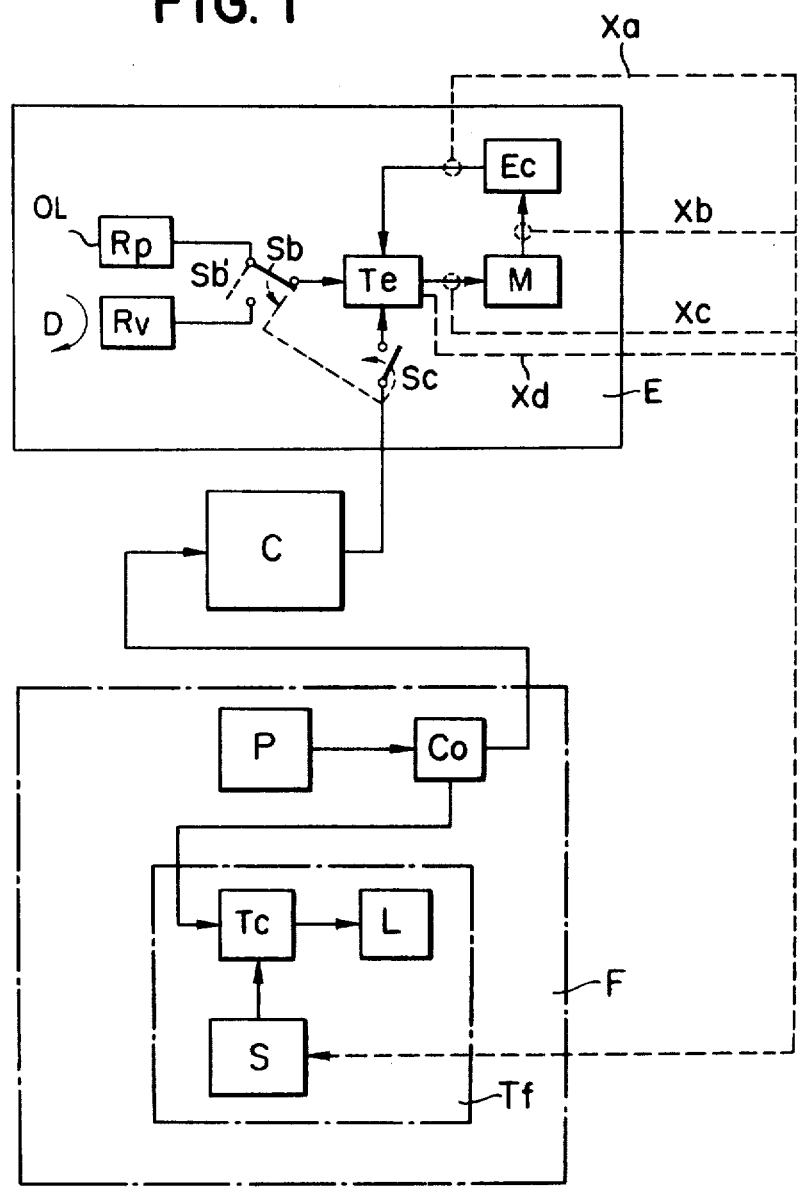
FIG. 1 is a schematic block diagram showing the basic constructions of the present invention.

In FIG. 1, $R_p$ is a variable resistor element receiving light $O_l$ from an object, $R_c$ is a variable resistor element or a variable power source for setting photographing information for flash exposure through a setting member D. $S_b$ is a change-over switch between a flash exposure and an exposure without flash exposure device, $T_e$ is an electronic timer circuit, and M is an electromagnetic device. $E_c$ is an exposure control device controlled by the timer circuit $T_e$ through the electromagnetic device M. The electronic timer circuit $T_e$ is started by the exposure control device $E_c$. $S_c$ is a change-over switch which may be preferentially closed in case an attachment for flashing is set. E shows a camera to which may be attached with an attachment for flashing. C is a control circuit, $C_o$ is a main capacitor, P is a high voltage power source, $T_c$ is a triggering circuit for a flash lamp that is a discharge lamp L, S is a synchronizer switching means, $T_f$ is a flash triggering assembly, and F is a flash device. $X_a$, $X_b$, $X_c$ or $X_d$ shows a path of a triggering signal for the synchronizer switching means S. The control circuit C serves to control the electronic timer circuit $T_e$ of the camera E in response to the voltage across the main capacitor $C_o$ of the flash device F.

Figure 2:
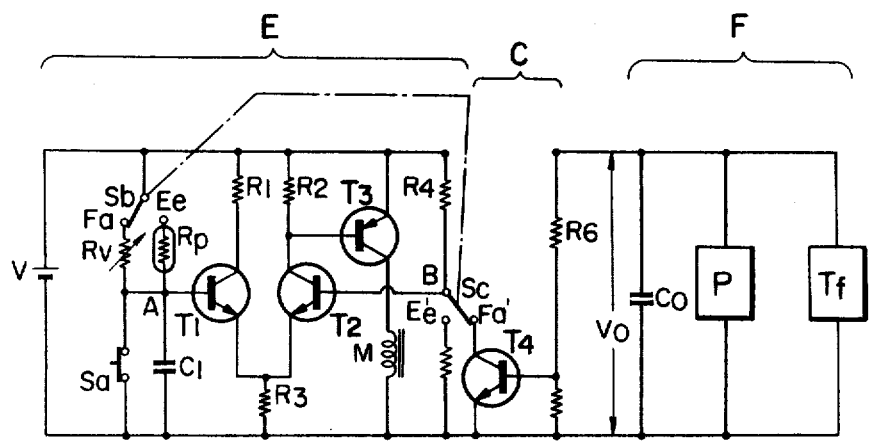
FIGS. 2 and 3 are respectively a circuit diagram schematically in part illustrating an embodiment according to the present invention.

The embodiment shown in FIG. 2 aims to provide a proper correction of a diaphragm aperture in a combination of a flash-auto mechanism with an electronic timer circuit and a flashing circuit that is a speed light circuit by detection of a change in guide numbers caused by the voltage across the capacitor $C_o$.

In FIG. 2, F is a speed light circuit which consists of a capacitor $C_o$, a booster circuit P and a trigger circuit $T_f$. E denotes an automatic exposure control circuit which is operative to deenergize a magnet M to operate a shutter closing member so as to determine a diaphragm aperture by inverting transistors $T_1$ and $T_2$ on and off, respectively, which together form a differential amplifier as well as a transistor $T_3$ which is off at a predetermined period of time after the opening of a timer start switch contacts Sa; the above period of time is determined by a capacitor $C_1$ and a variable resistor $R_e$ which is set in accordance with the film sensitivity and the distance to an object being photographed. The switching member $S_b$ and the switching member $S_c$ are respectively changed over from a terminal $E_e$ to a terminal $F_a$ and from a terminal $Ee'$ to a terminal $Fa'$. The explanation will be made mainly in case of the flash exposure.

While a signal is fed to a flash trigger circuit $T_f$ by interlocking motion with the operation of the magnet M which drives the shutter closing member, in order to close the synchro-contacts therein to permit illumination of a discharge lamp, details of which arrangement are not shown in the drawing.

The time at which the synchro-contacts are closed during the operation of diaphragm blades or shutter blades serving also as diaphragm blades is controlled by supplying the voltage $V_o$ across the capacitor $C_o$ of the speed light circuit F as a signal to the automatic exposure control circuit E which is adjusted in accordance with the distance to an object being photographed, film sensitivity and guide number, in a manner such that with an increase of the voltage $V_o$ or an increase of guide number, the shutter is closed earlier through a controller transistor $T_4$, that is, while the diaphragm aperture is small, thereby enabling a proper exposure to be achieved at all times.

For this purpose, is provided a bleeder circuit comprising resistors $R_6$ and $R_7$ connected across the capacitor $C_o$. A connecting point of the resistors $R_6$ and $R_7$ is connected to the base of the controller transistor $T_4$. The resistors $R_6$ and $R_7$ are chosen to have high resistance values so that the current flows therethrough and the loss therein may be negligibly small.

The output circuit of the transistor $T_4$ is arranged in a manner that the collector of the transistor $T_4$ is connectable to a reference point B in case of flash exposure. At the reference point B are connected the switching member $S_c$, the base of the transistor $T_2$ and the resistor $R_4$. In case of an automatic exposure control without flash, a resistor $R_5$ is arranged in place of the output circuit of the transistor $T_4$, which is connectable to the reference point B when the switching member contacts with the terminal $Ee'$. An input point A and the reference point B are input points to the differential amplifier circuit of the transistor $T_1$ and $T_2$.

As the transistor $T_4$ has a base potential of $(R_7 \cdot V_o/R_6 + R_7)$, and the current flowing from the base and the emitter thereof is proportional to $V_o$, the current from the collector to the emitter of the transistor $T_4$ increases in proportion to $V_o$. This means that when the charged voltage $V_o$ across the capacitor $C_o$ increases, that is when the guide member of the discharge lamp increases the current flow through the transistor $T_4$ increases. As a result, the voltage drop across the voltage dividing resistor $R_4$ increases, so that the potential at the reference point B or the base of the transistor $T_2$ decreases in an inversely proportional manner.

Figure 6:
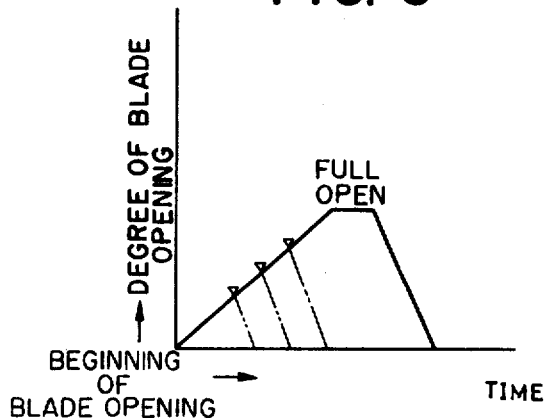
FIG. 6 shows the relation between a time from the beginning of blade opening and the degree of blade opening particularly in relation with the flash peak, that is an ignition time of the flash device.

On the other hand, the potential at the point A rises gradually at a rate determined by the capacitor $C_1$ and the resistor $R_e$ which is set according to the film sensitivity and the distance, and when it exceeds the potential of the point B, the differential amplifier operates in the manner mentioned above to deenergize the magnet M, thereby effecting the shutter closing operation. Thus, when the voltage across the main capacitor $C_o$ for the discharge lamp increases to lower the potential at the point B, the diaphragm is operated earlier to provide a smaller diaphragm aperture. In this manner, the higher guide number, the less becomes diaphragm aperture, thereby assuring a proper exposure. Such a relationship is shown in FIG. 6, in which ∆-marks indicate the time when the illumination is initiated.

If an EE-photographing is desired, the contacts $S_b$ and $S_c$ are moved to the EE terminals Ee and $Ee'$, whereupon the potential at the point B is held constant by resistors $R_4$ and $R_5$, while the potential at the point A depends upon the resistance of a photoconductor $R_p$, so that the signal to the magnet M is dependent upon the amount of light received by the photoconductor $R_p$.

Figure 3:
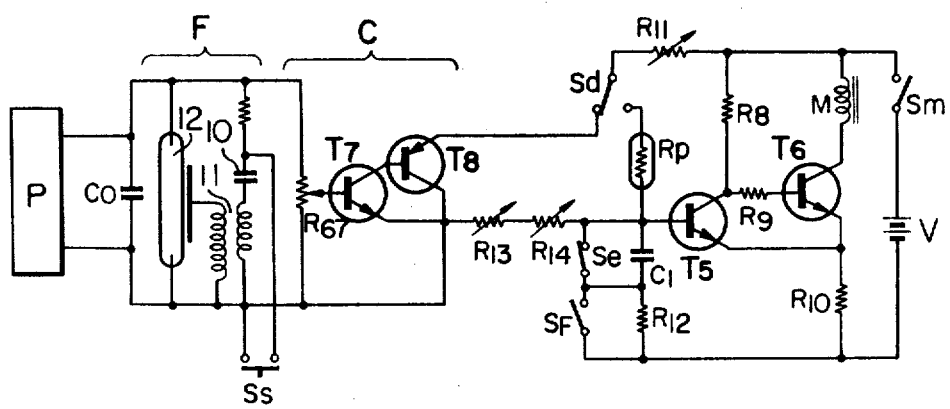
Figure 7:
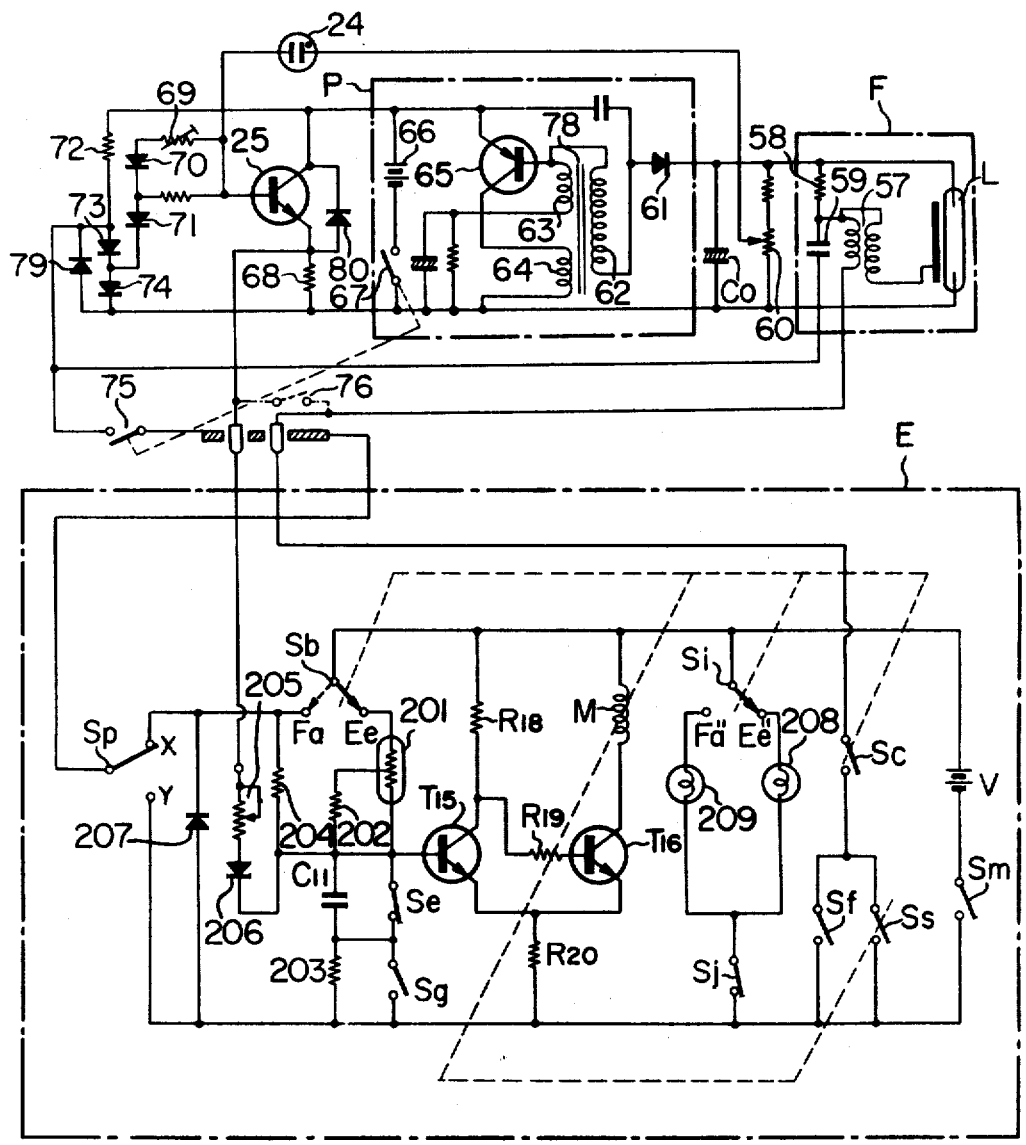
FIG. 7 shows a circuit construction of a camera attached with a flash device according to the present invention.
Figures 1, 8:
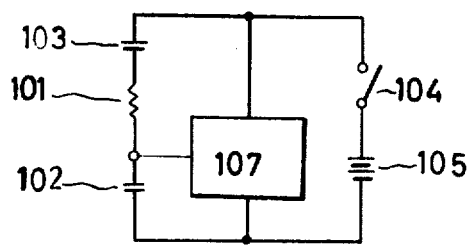
Figures 2, 8:
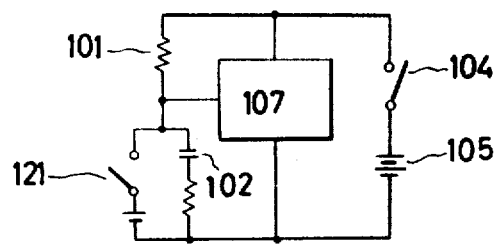

The circuits in FIGS. 3 and 7 are schematically shown in FIG. 8 – 1. The circuits in FIGS. 3 and 7 are modified as schematically shown in FIG. 8 – 2, for example.

Figure 4:
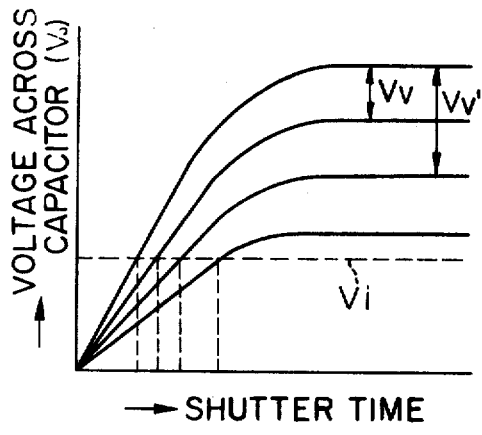
FIGS. 4 and 5 show the relation between a time from the beginning of blade opening and voltage across a capacitor, respectively corresponding to FIGS. 2 and 3.

In FIG. 8 – 1, 101 is a resistor, 102 is a timer capacitor both constituting a time constant circuit, to which is connected an auxiliary compensating power source 103, to cause a difference between the time determined through the time constant circuit without the compensating power source 103 and the time for charging the capacitor 102 to activate a controller 107 at an inverting potential $V_i$ after the closure of a main switch 104. This shows that the exposure time and the exposure aperture vary depending on the voltage of the compensating power source 103. In case the polarity of the source 103 is opposite to that of the source 105, as shown in FIG. 8 – 1, the smaller the voltage $V_c$ or $V_c'$ of the source 103, the sooner the capacitor 102 is charged up to the inverting voltage Vi of the controller 107 as shown in FIG. 4.

Thus, when the power source 103 is in response to a power source of the flash device, the amount of exposure may be varied through control of the exposure time and the F-number corresponding to the power source of the flash device. Thus an optimum exposure is attained.

In FIG. 3, L is a discharge lamp, 11 is a trigger coil of a trigger circuit Tp, 10 is a capacitor of the trigger circuit, $S_s$ is a synchronous switching member, $R_{67}$ is a potentio-meter, $T_7$ and $T_8$ are transistors of the controller circuit C. $R_{13}$ and $R_{14}$ are variable resistors, Sd is a change-over switch, Se is a start switch which is opened for exposure control and is closed for exposure detection, Sf is a switch constituting a timer which is opened for exposure detection, $R_{12}$ is a resistor for exposure detection, $R_{11}$ is a variable resistor the resistance value of which varies in response to an object distance, $T_5$ and $T_6$ are transistors forming a Schmitt circuit with aid of resistors $R_8$, $R_9$ and $R_{10}$.

The voltage charged across the capacitor $C_o$ is detected at the controller circuit 14 to control the exposure time and the aperture, thus an optimum exposure is obtained even with a deteriorated battery.

Figure 5:
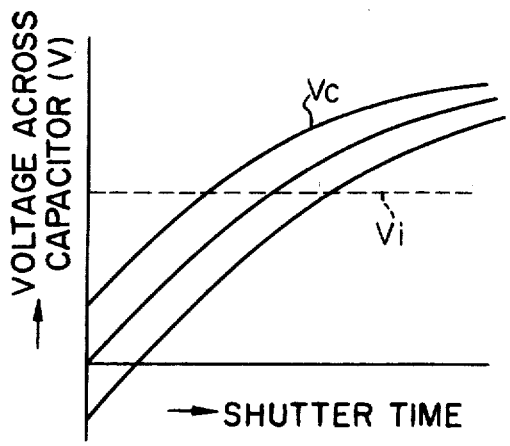

In FIG. 8 – 2, the compensating power source 103 is connected in parallel with the capacitor 102 through a switch 121. Before the main switch 104 is closed, the switch 121 is closed to charge across the capacitor 102 from the source 103, and after the switch 121 is opened the main switch 104 is closed. In this way, in case when the polarity of the power source 103 is same as that of the power source 105, the higher the voltage of the source 103, the sooner the exposure is completed as shown by the curve $V_c$ in FIG. 5.

FIG. 7 shows one example of a concrete circuit construction of a camera attached with a flash device according to the present invention. The flash device may be installed integrally in the camera as one unit.

In FIG. 7, 65 is a transistor for oscillation and interconnected to a primary winding 64 and a feed back winding 63 of a transformer 78; 62 is a secondary winding of the transformer 78 connected through a rectifier element 61 to a main discharge capacitor $C_o$; and F is a discharge circuit or a flash device including a trigger coil 57, a resistor 58 for charging a trigger capacitor 59 and a flash lamp L, and the discharge circuit F is coupled to a flash synchronizer switch 77 of the EE circuit E in the camera, the control circuit includes a variable resistor 60 connected in parallel with the main capacitor $C_o$, a neon discharge lamp 24 diodes 70, 71 and 74, and a transistor 25. The control circuit further includes an emitter resistor 68 of the transistor 25, a variable resistor 69 for correcting the voltage drop across the emitter resistor 68, a diode 73 for obtaining a constant voltage and a bias resistor 72 for applying a predetermined voltage across the diodes 73 and 74. The diodes 70, 71 and 74 serve to compress the variation in voltage across the main capacitor 11 and to compensate for the rising time of the voltage across the base and emitter of the transistor 25. 67 is a power switch of the flash device and when the power source 66 of the flash device is turned off, the EE circuit with an electronic timer in the camera may be disconnected from the control of the flash device.

In the present case shown in FIG. 7, however the switch 67 is opened and closed independently on the switching members in the camera. A switch 75 is interlocked with the power source 67 of the flash device in such a manner that when the power source 66 of the flash device is turned off to save the power source 66. The interlocked motion of the switches 67 and 75 is advantageous for attachment of another type of a camera. A switch 76 serves to safe guard against electric shock and is opened when the flash device is attached to the camera and closed when detached, so as to short-circuit the high voltage terminal for flash synchronization to a lower voltage level. The flash-auto mechanism E in the camera includes; a lamp 208 for checking a battery V, a lamp 209 for indicating flash exposure both of which lamps are cooperative with an electromagnet M; transistors $T_{15}$ and $T_{16}$ constituting a Schmitt circuit with aid of resistors $R_{18}$, $R_{19}$ and $R_{20}$; an input circuit comprising a photoconductive element 1 with three electrodes, a resistor 202, a timer capacitor $C_{11}$, a resistor 203, a switch Se for exposure detection, a switch Sg closing for the timer, both of the switches Se and Sg opening and closing in association with the shutter bottom, a resistor 4 for flash exposure under a certain constant exposure time, a potentio-meter 205 for photographing informations of the film sensitivity and the object distance and a diode 206 (not always necessary) serving to expand the variation in voltage from the flash device; a diode serves as an one-way switch for synchronization and several switching members; namely a change-over switch sb which contacts with a terminal $E_e$ and which is turned over to a terminal Fa by the magnet M in case of flash exposure; another change-over switch Si for indication of cameral conditions which contacts a terminals Ee" in case an automatic exposure control without flash exposure is achieved and which contacts a terminal Fa" by the energization of the magnet M in an associated manner; a normally closed switch Sc which is opened when the changeover switch member Sb contacts the terminal Fa by the energization of the magnet M also in an associated manner; a normally closed switch Ss for the synchronizer switch which is opened by the energization of the magnet M; a main switch Sm; a normally opened switch Sf for another synchronizer switch which is closed after a constant delay of time determined by the timer with the resistor 204 also actuated to close by the energization of the magnet M; a program switch $S_p$ which is set to contact with a terminal X. In case the flash device of the present invention is used and may be settled to a terminal Y for a conventional flash device; and a switch $S_j$ for saving power consumption, which is normally closed but may be opened by further pressing of a shutter button under the control of the magnet M.

When the program switch $S_p$ contacts with the terminal Y, a trigger terminal of the conventional flash device must be connected to effect flash actuation.

In the embodiment shown in FIG. 7 the shutter blade serves also as a diaphragm blade.

With the attachment of the flashing device to the camera, when the shutter button is pressed down, the main switch is closed to check the voltage of the battery by the lamp 208', and in case of a dark object the exposure detection is effected by the photoconductor 201 and the resistors 202 and 203.

After the detection, when the shutter bottom is further pressed down, the switches Si and Sb are changed over respectively from the terminal Ee" to the terminal Fa" and from the terminal Ee to the terminal Fa, and in this state as the switch $S_j$ is closed, the lamp 209 indicates the condition of the flash exposure. In this state, the switch $S_c$ is also closed. When the shutter button is still further pressed down, the switch $S_e$ is opened and simultaneously the switch $S_g$ is closed to start the shutter opening and the counting in response to the photographing informations through the resistor 205 and the voltage across the capacitor Co. After a certain period of time for an optimum exposure, namely an optimum aperture, the shutter is closed by the deenergization of the magnet M. And the whole system is reset by the release of the shutter button. Simultaneously with the beginning of the shutter closure, the switch Ss is closed by the deenergization of the magnet M to ignite the discharge lamp L.

It will be noted various modifications may be made to the embodiment shown in FIG. 7.

What is claimed is:

1. A photographic flash system for operating a shutter, comprising shutter control means for controlling the time during which the shutter is open, capacitor means, charger means connected to said capacitor means for charging said capacitor means, flash means coupled to said charger means and said capacitor means for producing a flash on the basis of the charge across said capacitor means, and circuit means responsive to the charge across said capacitor means for varying the operation of said shutter control means so as to constrain said shutter control means to control the time during which the shutter is open on the basis of the charge across said capacitor means.

2. A photographic system for use with a flash device, comprising a flash-auto mechanism including an electronic timer circuit for exposure control, a capacitor for storing charge, a supply circuit connected across said capacitor for charging said capacitor, a control circuit coupled across said capacitor for detecting the charge across said capacitor, a discharge circuit connected across said capacitor and including a discharge lamp for triggering the discharge lamp on the basis of the charge across said capacitor, and a circuit network in said control circuit for delivering the detected signal of said control circuit to said flash-auto mechanism so as to constrain said flash-auto mechanism to produce an optimum exposure on the basis of the detected signal.

3. A photographic system as in claim 2, wherein the electronic timer circuit includes a switching circuit and shutter actuating means responsive to the switching circuit.

4. A system as in claim 3, wherein said switching circuit includes a differential amplifier.

5. A system as in claim 3, wherein said switching circuit includes a Schmitt circuit.

6. A photographic system as in claim 2, further comprising an automatic light-responsive shutter speed control mechanism including said electronic timer circuit and a changeover switching means for switching between said flash-auto mechanism and said automatic light-responsive shutter speed control mechanism.

7. A photographic system as in claim 6, wherein the electronic timer circuit comprises a start switch responsive to opening of a shutter, and an electromagnet for actuating closure of the shutter after a certain time so as to produce an optimum exposure.

8. A photographic system for use with a flash device according to claim 7 in which the blade functions as either a shutter blade or an iris blade.

9. A photographic system for use with a flash device according to claim 7 which the blade functions as both a shutter blade and an iris blade.

10. A photographic system for use with a flash device according to claim 7 which further comprises a contact switch for triggering the discharge circuit to ignite the discharge lamp, said contact switch being closed at the beginning of the shutter closure.

11. A photographic system for use with a flash device according to claim 6 in which the electronic timer circuit has a time constant circuit with a timer capacitor.

12. A photographic system for use with a flash device according to claim 11 in which an output circuit of the control circuit is connected in series with the timer capacitor.

13. A photographic system for use with a flash device according to claim 11 in which an output circuit of the control circuit is connected in parallel with the timer capacitor.

14. A photographic system for use with a flash device according to claim 6 which further comprises a synchronizer switch controlled by an output from the electronic timer circuit, in such a manner as directly, through an electromagnet actuating shutter closure or substantially at the beginning of shutter closure.

15. A photographic system for use with a flash device according to claim 6 which further comprises a synchronizer switch controlled directly by an output from the electronic timer circuit.

16. A photographic system having a shutter and a flash device comprising, shutter control means for opening and closing the shutter and having a synchro-contact, a flash device, voltage means coupled to said flash device and said shutter control means for actuating said flash device and said shutter control means simultaneously on the basis of the voltage in said voltage means, said voltage in said voltage means being used as a signal to said shutter control means and being adjusted in accordance with a distance to an object to be photographed as well as the film sensitivity and guide number of the photographic system, said shutter control means responding so that as the voltage increases the shutter is closed earlier.

17. A photographic system for operating a shutter, comprising shutter control means for controlling the shutter speed and the aperture of the shutter, voltage forming means exhibiting a voltage corresponding to photographic information entered into said voltage forming means, said voltage forming means having a compensating power source, said control means including a time constant circuit connected to the compensating power source and a main power source connected to the time constant circuit, said time constant circuit including regulating means connectable for effecting electronic exposure control.

18. A photographic system for use with a flash device according to claim 17 in which the compensating power source is connected in parallel to at least one element of the time constant circuit.

19. A photographic system for use with a flash device according to claim 17 in which the compensating power source is connected in series to at least one element of the time constant circuit.

20. A photographic system for use with a flash device according to claim 17 in which the compensating power source is connected to the time constant circuit to form a Wheatstone bridge circuit therewith.

21. A photographic system for use with a flash device according to claim 17 in which the compensating power source is a power source responsive to a power source of a flash device.

* * * * *